(12) United States Patent
Saint-Jalmes et al.

(10) Patent No.: US 8,469,311 B2
(45) Date of Patent: Jun. 25, 2013

(54) AIRCRAFT FUSELAGE COMPRISING A SPACE FOR WORK AND STORAGE AT THE REAR THEREOF

(75) Inventors: Bruno Saint-Jalmes, Toulouse (FR); Jason Zaneboni, Blagnac (FR); Bernard Rumeau, Cornebarrieu (FR)

(73) Assignee: Airbus, Blagnac (FR)

( * ) Notice: Subject to any disclaimer, the term of this patent is extended or adjusted under 35 U.S.C. 154(b) by 204 days.

(21) Appl. No.: 12/412,859

(22) Filed: Mar. 27, 2009

(65) Prior Publication Data
US 2009/0261200 A1 Oct. 22, 2009

(30) Foreign Application Priority Data
Mar. 27, 2008 (FR) ...................... 08 01668

(51) Int. Cl.
*B64D 11/00* (2006.01)
*B64D 11/06* (2006.01)

(52) U.S. Cl.
USPC ........................ 244/118.5; 244/119

(58) Field of Classification Search
USPC ............ 244/117 R, 118.1, 118.5, 119, 129.1, 244/120
See application file for complete search history.

(56) References Cited

U.S. PATENT DOCUMENTS

| | | | | |
|---|---|---|---|---|
| 4,022,404 A * | 5/1977 | Greiss | | 244/118.5 |
| 4,055,317 A | 10/1977 | Greiss | | |
| 6,073,883 A * | 6/2000 | Ohlmann et al. | | 244/118.5 |
| 6,572,054 B1 * | 6/2003 | Smallhorn | | 244/119 |
| 6,705,567 B2 * | 3/2004 | Dong et al. | | 244/13 |
| 6,834,833 B2 * | 12/2004 | Sankrithi | | 244/119 |
| 7,178,954 B2 * | 2/2007 | Blechschmidt | | 362/471 |
| 7,198,228 B2 * | 4/2007 | Mills et al. | | 244/118.5 |
| 2003/0106962 A1 * | 6/2003 | Smallhorn | | 244/118.5 |
| 2003/0213870 A1 * | 11/2003 | Eakins et al. | | 244/119 |
| 2004/0195446 A1 * | 10/2004 | Smallhorn | | 244/118.5 |
| 2004/0245375 A1 * | 12/2004 | Adamson et al. | | 244/15 |
| 2006/0054741 A1 | 3/2006 | Mills et al. | | |
| 2006/0060704 A1 * | 3/2006 | Lavie et al. | | 244/118.5 |
| 2006/0097553 A1 | 5/2006 | Spurlock et al. | | |
| 2006/0202085 A1 * | 9/2006 | Schotte et al. | | 244/119 |
| 2006/0214057 A1 * | 9/2006 | Saint-Jalmes et al. | | 244/118.6 |
| 2007/0018046 A1 | 1/2007 | Boren | | |
| 2007/0278346 A1 * | 12/2007 | Masset-Bosc et al. | | 244/118.5 |
| 2009/0146004 A1 * | 6/2009 | Plant | | 244/118.5 |
| 2009/0250554 A1 * | 10/2009 | Graeber et al. | | 244/120 |
| 2009/0308973 A1 * | 12/2009 | Guering | | 244/58 |

* cited by examiner

*Primary Examiner* — Bret Hayes
*Assistant Examiner* — Joshua Freeman
(74) *Attorney, Agent, or Firm* — Oblon, Spivak, McClelland, Maier & Neustadt, L.L.P.

(57) ABSTRACT

This fuselage comprises a wall and side doors as well as a space arranged behind the side door the farthest to the rear of the aircraft. The space for work and storage is delimited by side walls formed by the fuselage of the aircraft and by a transverse bulkhead. This space comprises housings for carts arranged along the transverse bulkhead. An aisle serves the housings arranged along the transverse bulkhead and has a transverse portion that is arranged entirely behind the side door the farthest to the rear of the aircraft. At least one housing for a cart is arranged on the other side of the transverse portion of the aisle in relation to the housings arranged along the wall, and each of the housings for accommodating a cart extends longitudinally in relation to a longitudinal axis relative to the aircraft.

7 Claims, 6 Drawing Sheets ved by the invention advantageously also will make it possible to
AIRCRAFT FUSELAGE COMPRISING A SPACE FOR WORK AND STORAGE AT THE REAR THEREOF

BACKGROUND

1. Field

This invention concerns an aircraft fuselage and more particularly a layout of the rear space of an aircraft intended for the transport of passengers and more particularly for the integration of service carts at the rear of such an aircraft.

2. Description of the Related Art

Aircraft intended for the transport of passengers, in particular those intended for long-distance flights, comprise a cabin accommodating the passengers. For the comfort of the passengers, kitchens, also called galleys, are provided in the cabin to stock and/or prepare meals, and the serving of these meals is performed by the commercial flight personnel with the aid of carts, also called trolleys. The galleys and storage spaces for the carts are provided at various locations distributed in the cabin of the aircraft. In general, the rear of the cabin of such an aircraft, that is, the space behind the last door of the aircraft, is laid out to accommodate carts and has a work space provided for preparing the meals intended to be carried by the carts.

The document U.S. Pat. No. 4,055,317 discloses a layout of the rear space of an aircraft in which a platform implemented above the level of the main deck of the aircraft serves as a floor for space serving for both the preparation of meals and the stocking of carts. Carts also are stored under the platform. An elevator is provided to transfer the carts from the level of the platform to the level of the main deck of the aircraft.

As for the document US-2007/0 018 046, it discloses a rear-portion layout of an aircraft in which storage spaces are provided for accommodating carts, the latter being arranged fanned out along the wall of the aircraft, being arranged more or less perpendicular to this wall.

As for the document U.S. Pat. No. 7,198,228, it discloses an aircraft rear-portion layout in which a housing sufficiently deep to accommodate at least two carts one behind the other is provided. This housing, in the embodiments represented, occupies more or less the entire available surface area behind the last door of the aircraft. It also may be fitted out as a rest space to accommodate flight personnel.

These documents disclose aircraft rear-space layouts provided for housing carts and/or preparing meals. In comparison with these documents of the prior art, this invention has as its purpose to provide an aircraft rear space the layout of which is optimized for accommodating a greater number of carts and galleys, in particular refrigerated galleys.

Such a rear space preferably also will be adjustable in order to permit configurations making it possible, for example, to accommodate lavatories (when the aircraft is used for charter flights, for example).

By virtue of the optimization provided, the layout proposed by the invention advantageously also will make it possible to increase the number of passengers in the cabin of the aircraft, abiding by the safety standards, of course.

SUMMARY

To this end, this invention proposes an aircraft fuselage comprising a wall and side doors as well as a space for work and storage arranged behind the side door the farthest to the rear of the aircraft and delimited on the one hand by two side walls formed by the fuselage of the aircraft and on the other hand by a more or less transverse bulkhead, the said space for work and storage comprising housings intended to accommodate carts, the said housings being arranged along the said more or less transverse bulkhead.

According to this invention, the housings are arranged along the more or less transverse bulkhead from one side wall to the other; an aisle serves the housings arranged along the transverse bulkhead; the said aisle has at least one transverse portion in relation to the aircraft, the said transverse portion being arranged entirely behind the side door the farthest to the rear of the aircraft; at least one housing intended to accommodate a cart is arranged on the other side of the transverse portion of the aisle in relation to the housings arranged along the wall, and each of the said housings for accommodating a cart extends longitudinally in relation to a longitudinal axis relative to the aircraft.

This layout of the space at the rear of the last door of an aircraft makes it possible to optimize the organization of the carts (in lined-up position) while making it possible to have a relatively roomy work space for the flight personnel who prepare the meals and drinks to be served to the passengers.

A variant embodiment provides that a row of several housings for carts is situated facing the housings for carts arranged along the transverse bulkhead on one side of the transverse portion of the said aisle, referred to as first aisle, and that a second aisle extends crosswise in such a way that the said row of several housings for carts is between the first aisle and the second aisle. According to this variant, a set of housings is surrounded by the first aisle and by the second aisle which in this way form a passage around the set of housings having the shape of an O. This embodiment is advantageous in particular for the movement of the carts when the carts are removed and replaced on board the aircraft during a stopover.

Another variant embodiment provides that a set comprising at least one lavatory and at least one housing for carts is situated facing the housings for carts arranged along the transverse bulkhead on one side of the transverse portion of the said aisle, referred to as first aisle, that a second aisle extends crosswise in such as way that the said row of several housings for carts is between the first aisle and the second aisle, and that the access door to each lavatory is arranged so as to permit access to the corresponding lavatory from the second aisle. This embodiment is intended for the most part for a "charter" type aircraft aboard which a large number of passengers must be able to be seated—hence the need for one or more additional lavatories—and in which service is reduced—thus limiting the number of carts required for service.

In these two variant embodiments, the second aisle extends, for example, crosswise at the side door the farthest to the rear of the aircraft.

According to another embodiment, a row of several housings for carts is situated facing the housings for carts arranged along the transverse bulkhead on one side of the transverse portion of the said aisle, referred to as first aisle, and housings for carts are placed next to the said row of several housings for carts on the side opposite the transverse portion of the first aisle, the said housings for carts extending crosswise in relation to the aircraft. Here there is no second aisle as mentioned above. The shape of the aisle here suggests the shape of a D, this aisle serving for the movement of carts and also as work space for the flight personnel.

In order to increase the number of passengers able to be seated in the aircraft, one embodiment provides a row of several housings for carts which is situated facing the housings for carts arranged along the transverse bulkhead on one side of the transverse portion of the said aisle, referred to as first aisle, and seats arranged along the said row of several housings for carts on the side opposite the transverse portion of the first aisle. In such a configuration, seats may come to be situated at the last door of the aircraft, thus allowing an optimization of the number of passengers able to travel in the corresponding cabin.

In order to facilitate the preparation of meals to be served to the passengers, a work surface advantageously is laid out above the housings for carts arranged along the transverse bulkhead.

The invention also provides an embodiment of an aircraft fuselage comprising a wall and side doors as well as a space for work and storage, the latter being arranged behind the side door the farthest to the rear of the aircraft and delimited on the one hand by two side walls formed by the fuselage of the aircraft and on the other hand by a more or less transverse bulkhead, the said space for work and storage comprising housings intended to accommodate carts, the said housings being arranged along the said more or less transverse bulkhead, characterized in that the housings are arranged along the more or less transverse bulkhead from one side wall to the other, in that an aisle serves the housings arranged along the transverse bulkhead, in that the said aisle has at least one transverse portion in relation to the aircraft, the said transverse portion being arranged entirely behind the side door the farthest to the rear of the aircraft, in that at least one lavatory is arranged on the other side of the transverse portion of the aisle in relation to the housings arranged along the wall, and in that each of the said housings for accommodating a cart extends longitudinally in relation to a longitudinal axis relative to the aircraft.

In this embodiment, as already provided above, it also may be provided that a second aisle extends crosswise in such a way that each of the said lavatories is between the first aisle and the second aisle, and in that the access door to each lavatory is arranged so as to permit access to the corresponding lavatory from the second aisle.

This invention also concerns an aircraft cabin, characterized in that it is arranged in an aircraft fuselage such as described above, as well as an aircraft intended for the transport of passengers, characterized in that it comprises such a fuselage.

BRIEF DESCRIPTION OF THE DRAWINGS

Details and advantages of this invention will become more evident from the description that follows, presented with reference to the attached schematic drawing, on which.

DETAILED DESCRIPTION

Figure 1:
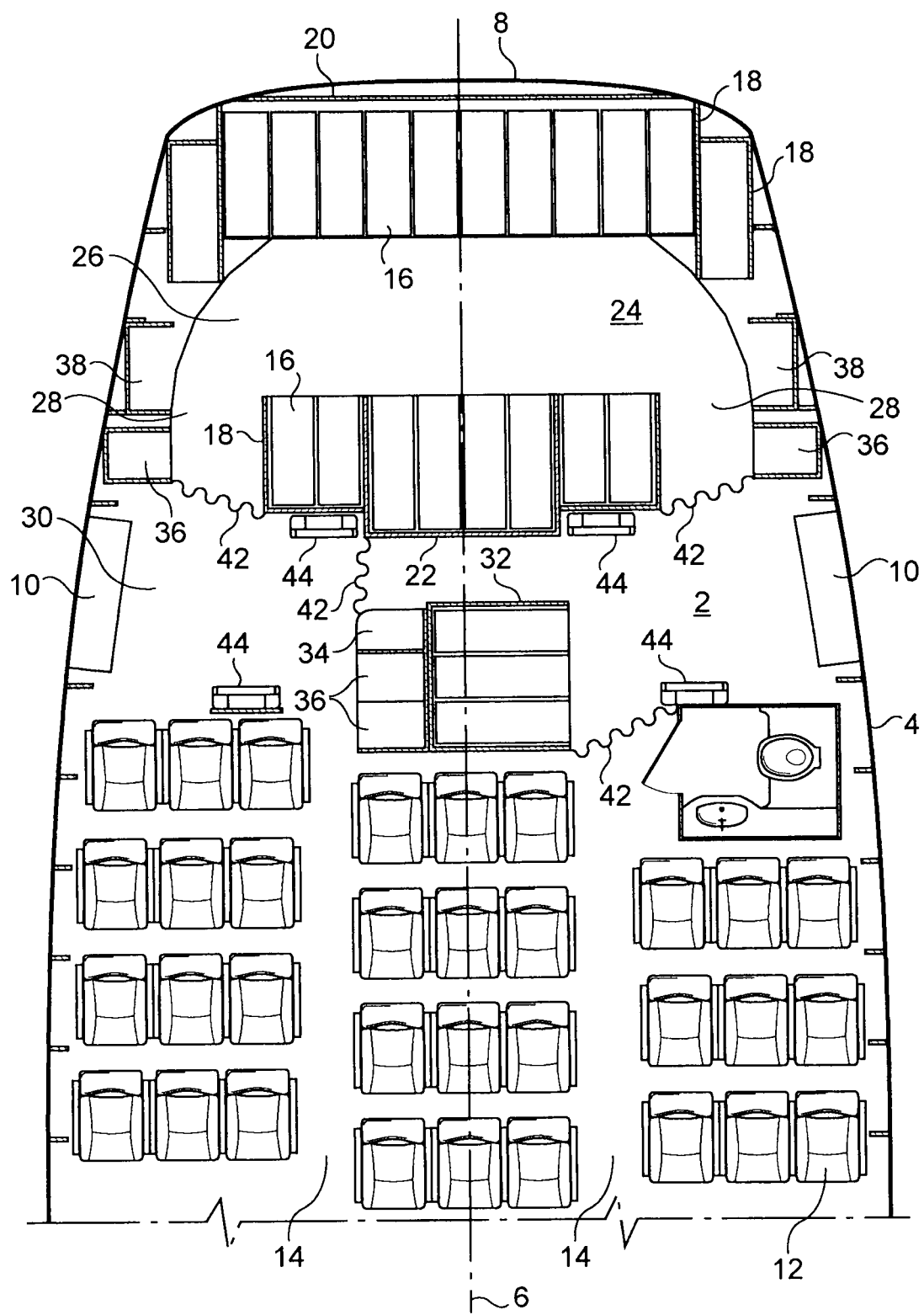
FIG. 1 is a plan view, and partially in horizontal section, of a layout of the rear part of an aircraft, according to this invention.

The various Figures represent the rear part of a cabin of an aircraft intended for the transport of passengers. Here it is a matter of an aircraft of the type commonly used by airline companies for the transport of passengers over long distances. Such an aircraft generally allows transport of at least two hundred passengers. It is assumed here that it is an aircraft of the single-deck type, comprising a main deck on which there is laid out at the front of the aircraft a cockpit (not represented) in which the pilots are seated in order to fly the aircraft. A passenger cabin is laid out behind the cockpit as far as the rear of the airplane. The drawings show the part of the passenger cabin located at the end of the main deck opposite the cockpit. A hold (not represented) usually is provided beneath the main deck.

The passenger cabin is delimited by a floor 2, by a cabin wall 4 and by a ceiling (not represented). The floor 2 henceforth is considered as being more or less level and horizontal. As for the cabin wall 4, it extends more or less vertically and is curved, as the individual skilled in the art knows.

The cabin extends longitudinally in relation to a longitudinal axis 6 (FIG. 1) of the aircraft. The cabin wall 4 comprises side walls that correspond to the fuselage of the aircraft and, on the side opposite the cockpit, the wall 4 of the cabin is formed by a bulkhead extending more or less crosswise in relation to the axis and referred to as watertight bulkhead 8. The latter separates the cabin from a non-pressurized technical compartment arranged in the rear end of the fuselage, also referred to as rear cone of the aircraft.

The cabin wall 4 comprises several doors allowing access to and evacuation from the passenger cabin. These doors are distributed along the cabin. The term "door" generally refers to a set of two facing doors arranged on both sides of the cabin, symmetrically in relation to the longitudinal axis 6 of the aircraft. On the Figures, there thus has been represented the last door 10 of the aircraft, that is, the door (i.e. the pair of doors) located the farthest to the rear in relation to the longitudinal axis 6 of the aircraft, or else, expressed differently, the farthest away from the cockpit.

The passenger cabin usually has seats 12 fastened to the floor 2. In the embodiments represented, the seats 12 are grouped in threes, thus forming transverse rows of seats arranged one behind the other and two aisles 14 thus separating groups of rows of seats.

This invention concerns more particularly the layout of the cabin of the aircraft at the rear of the last door 10. This space is a space for work and storage for the commercial flight personnel. Indeed, during air travel, in particular during long-distance flights, drinks and meals are offered to the passengers. It therefore is advisable to provide places for stocking the drinks and foodstuffs and for preparing them prior to serving them. These stocking and preparation spaces generally are referred to by the English term "galley," translated as cuisine [kitchen]. The meals prepared in the galley then are arranged with drinks on carts (also referred to as "trolleys") for serving to the passengers. These carts 16 are stored in housings 18 when they are not being used. The depth of each of the housings 18 corresponds more or less to the length of the cart 16.

The carts 16 are of standard shape and size. They are of parallelepipedal shape and are equipped with casters. In a view from above, they have an elongated rectangular shape.

In the layout shown on FIG. 1, several housings 18 are provided. First there are housings 20 arranged along the watertight bulkhead 8. These housings 20 are arranged one beside the other forming a row from one side wall of the cabin as far as the other side wall. In order to optimize the number of housings 20 and the available space, the two housings 20 at the two ends of the row of housings arranged along the watertight bulkhead 8 are moved forward toward the front of the aircraft.

Facing this first row of housings 20, there is a second row of housings 22, those also intended to accommodate carts 16.

This second row extends crosswise in the aircraft cabin and is more or less centered on the longitudinal axis 6. It has a lesser width in comparison with the first row.

An aisle 24 separates the two rows of housings described previously. This aisle 24 also comes to surround the second row of housings 22 on the sides. This aisle 24 thus has a transverse portion 26 and two branches 28. The transverse portion 26 extends between on the one hand the first row of housings 20 and on the other hand the second row of housings 22, while each branch 28 extends longitudinally along one end of the second row of housings 22. This transverse portion 26 has a sufficient width to make it possible to take out and put back the carts 16 in their housings on both sides of the aisle 24 without difficulties. A width of aisle 24 of at least 38" (or at least 96.5 cm) thus is provided at the transverse portion 26. This width preferably is on the order of 39 to 40" (or about 1 m), which width makes it possible on the one hand to easily manipulate the carts 16, and on the other hand leaves a sufficient work space for the flight personnel to move around and prepare the meals. Furthermore, these dimensions make it possible not to waste space.

In the embodiment of FIG. 1, a transverse aisle 30 also is provided at the door 10. The second row of housings 22 thus is surrounded on the one hand by the aisle 24 and on the other hand by the aisle 30. In this way, an O-shaped configuration is obtained, the shape of the two aisles 24 and 30 together forming an O around the second row of housings 22. The minimal width of the aisles 24 and 30 is, in accordance with the standard, at least 21.5' (or 54.61 cm).

In this first embodiment, there also is seen the presence of a monument 32 (a term used to designate a component fastened to the floor in the layout of an aircraft cabin). This monument 32 comprises, for example, an access to a rest compartment (not represented) arranged in the upper portion of the cabin, above the seats 12. A stairway 34 makes it possible, for example, to reach a vestibule giving access to one (or more) berth(s) arranged in the upper portion of the cabin. The space arranged underneath the raised vestibule then allows the storage of carts 16 as well as demi-carts 36. At monument 32, the carts 16 and the two demi-carts 36 are stored being positioned crosswise. There is seen again here a standard placement of carts for such a monument. It is observed here that these carts are stored ahead of the door 10 and do not form part of the actual layout of the rear space of the cabin.

In order to optimize the storage space, layouts also are implemented along the side walls of the aircraft cabin, between the first row of housings 20 and the door 10. In the embodiment of FIG. 1, on each side of the cabin there is on the one hand a housing for a demi-cart 36 and on the other hand a trash can 38.

Figure 2:
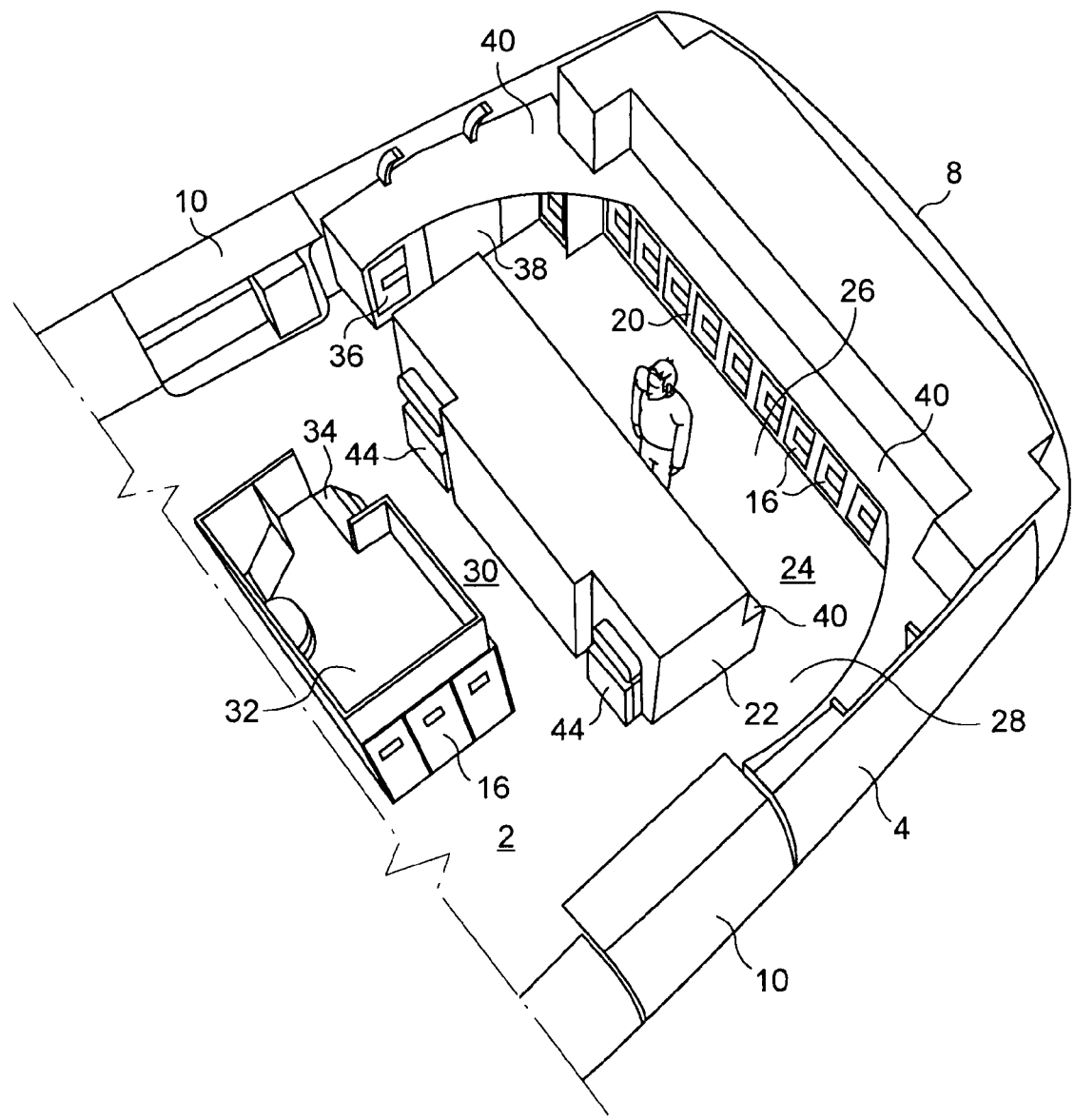
FIG. 2 is a perspective view of the layout of FIG. 1.

FIG. 2 in perspective makes it possible to better understand the layout of the space at the rear of the cabin of the aircraft. A work surface 40 is provided above the housings 20 and 22. It may be used for the preparation of meals prior to arranging them in the carts 16.

Certain storage spaces must be refrigerated in order to preserve the foodstuffs at proper temperature prior to serving them and in order to chill the drinks. It is not necessary to plan to refrigerate all the housings 20 and 22. Thus, for example, it is observed that in the second row of housings 22, the housings 22 at the center of the row are more voluminous than those at the ends of the said row. This additional volume accommodates refrigeration means for the carts. It may be provided, for example, that all the housings 20 of the first row of housings themselves also are refrigerated.

On FIG. 1, the wavy lines represent curtains 42 that make it possible to separate the space normally reserved for the flight personnel during a flight from the space occupied by the passengers. There also is observed on FIGS. 1 and 2 the presence of folding seats 44 intended for the commercial flight personnel for the takeoff and landing phases. Two of these seats are fastened onto the second row of housings 22 on the side of aisle 30.

Figure 3:
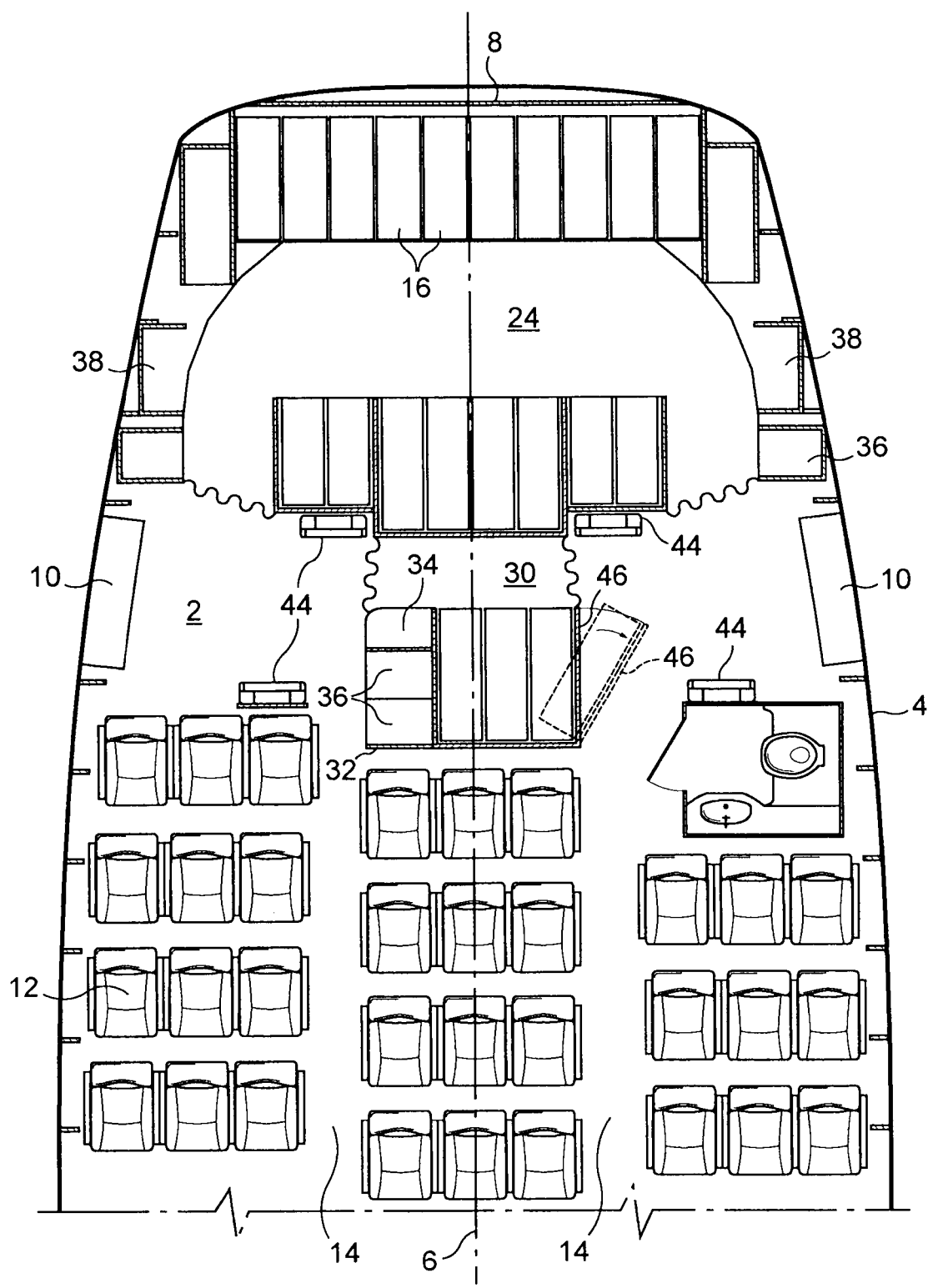
FIG. 3 is a view from above corresponding to FIG. 1 for a first variant embodiment of the invention.

In the embodiment shown on FIG. 3, the changes introduced concern the monument 32.

In this variant embodiment, the carts 16 stored in the monument 32 are arranged longitudinally in relation to the longitudinal axis 6 of the aircraft. The corresponding housings, implemented in the monument 32, open onto the transverse aisle 30. In order to avoid having to widen this aisle, a side door 46 is provided at the housings of the monument 32. This door opens toward an aisle 14 that ends at the rear of the aircraft, coming to run alongside the monument 32. Thus, as illustrated in dotted lines on FIG. 3, it is possible, by opening side door 46, to have the carts 16 stored in the monument pivot before bringing them out of their housing. An arm, not represented, advantageously is provided in order to limit the movement of the side door 46 during opening thereof.

Figure 4:
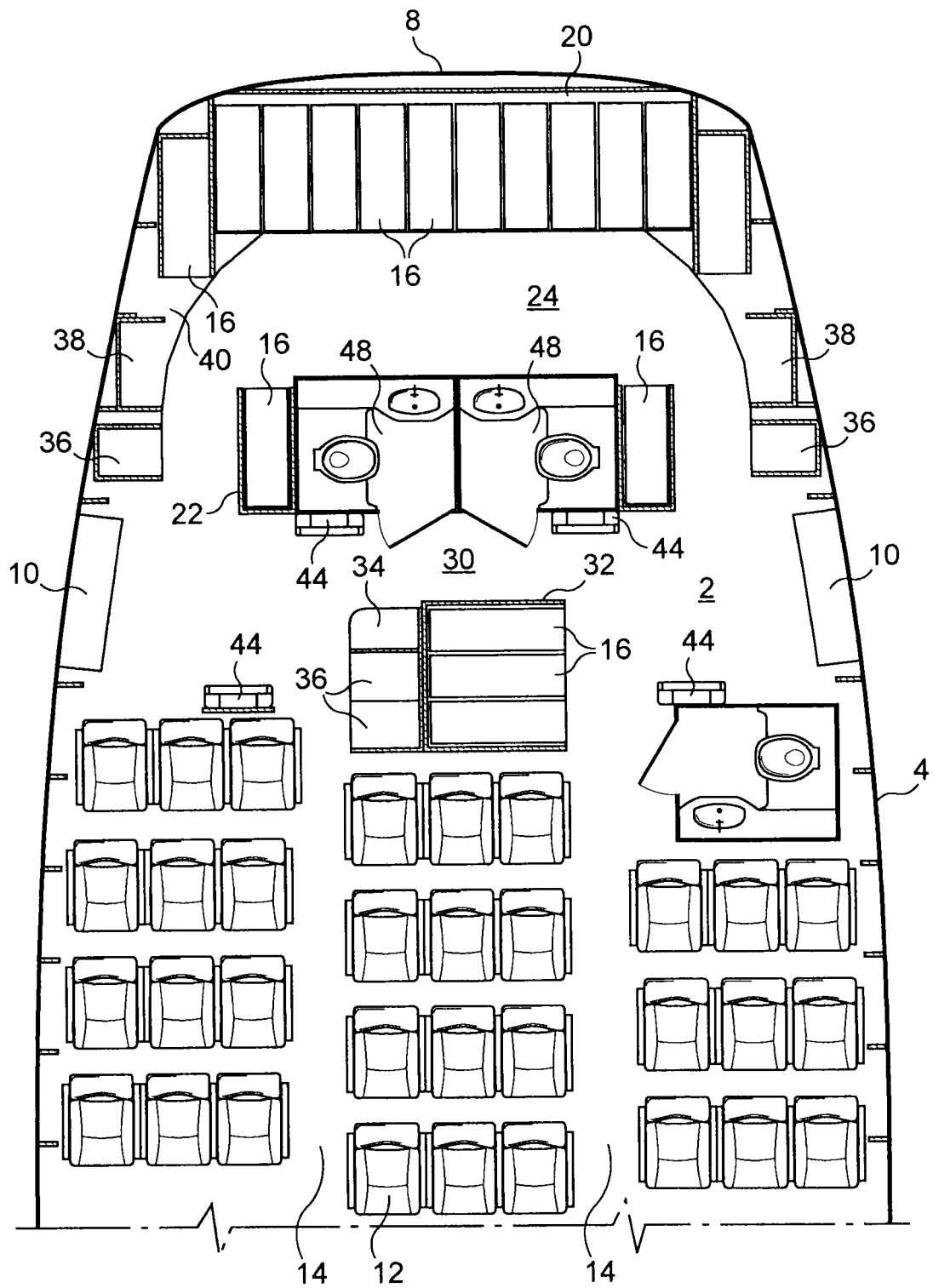
FIG. 4 is a view from above corresponding to FIGS. 1 and 3 for a second variant embodiment of a layout according to this invention.

FIG. 4 shows a variant of the layout proposed on FIG. 1. The layout shown on this Figure is more particularly suited to an aircraft intended to make so-called "charter" flights. For such flights, the number of passengers generally is higher than for standard long-distance flights, and the serving of drinks and meals is reduced. Consequently, it is necessary to provide a greater number of lavatories in order to adapt to the number of passengers, but the number of housings for accommodating carts may be reduced.

The embodiment of FIG. 4 thus proposes replacing six housings intended to accommodate carts with two lavatories 48. The latter are laid out in place of housings 22 of the second row of housings for carts. The lavatories 48 are implemented in such a way that they are accessible from the aisle 30. In this way, it is not necessary to go through aisle 24 and the corresponding galley to reach the lavatories 48. The lavatories 48 may replace all the housings 22 according, in particular, to the width of the fuselage of the aircraft.

Figure 5:
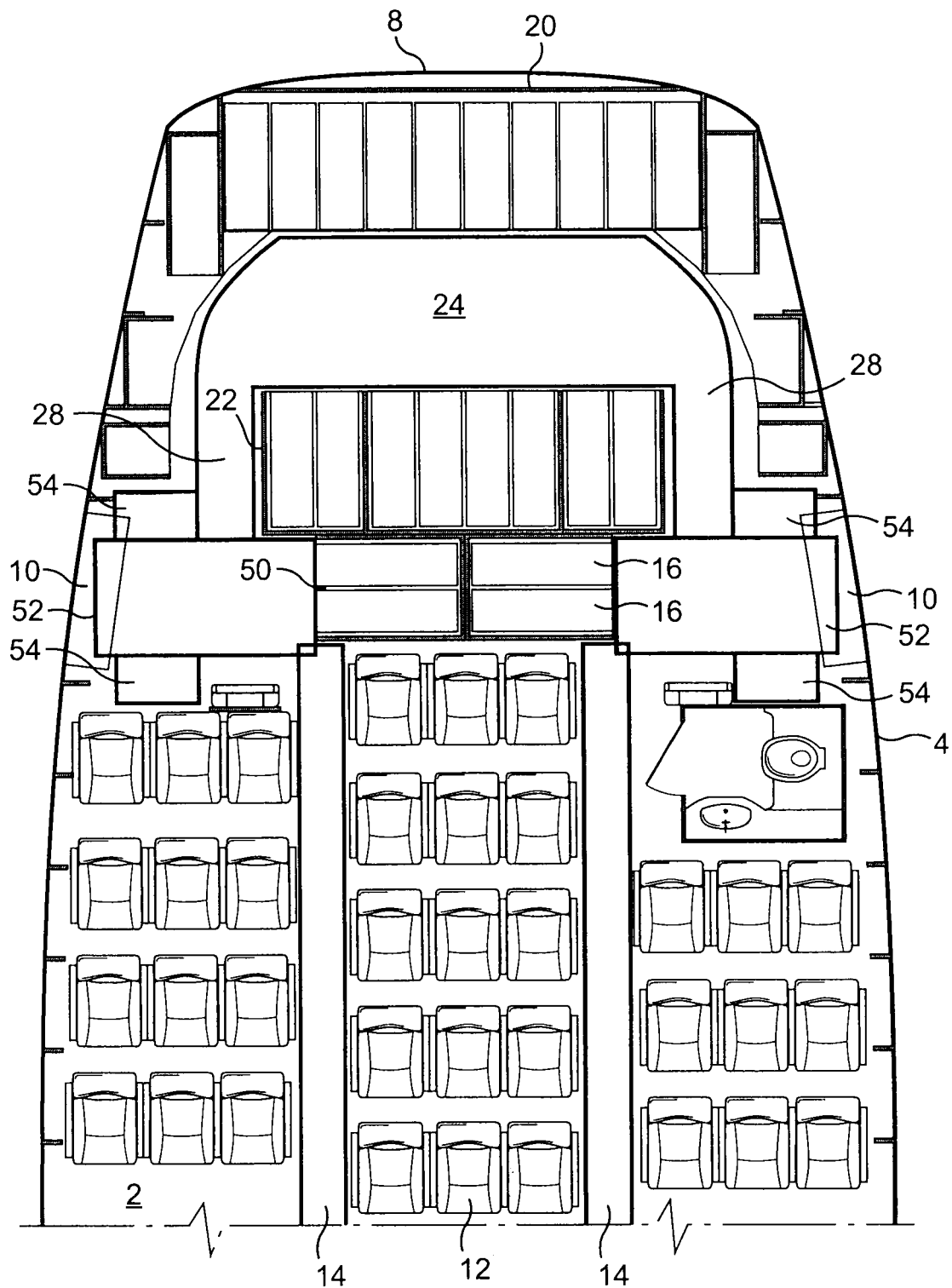
FIG. 5 shows, in a partially cutaway view from above, a third variant embodiment.
Figure 6:
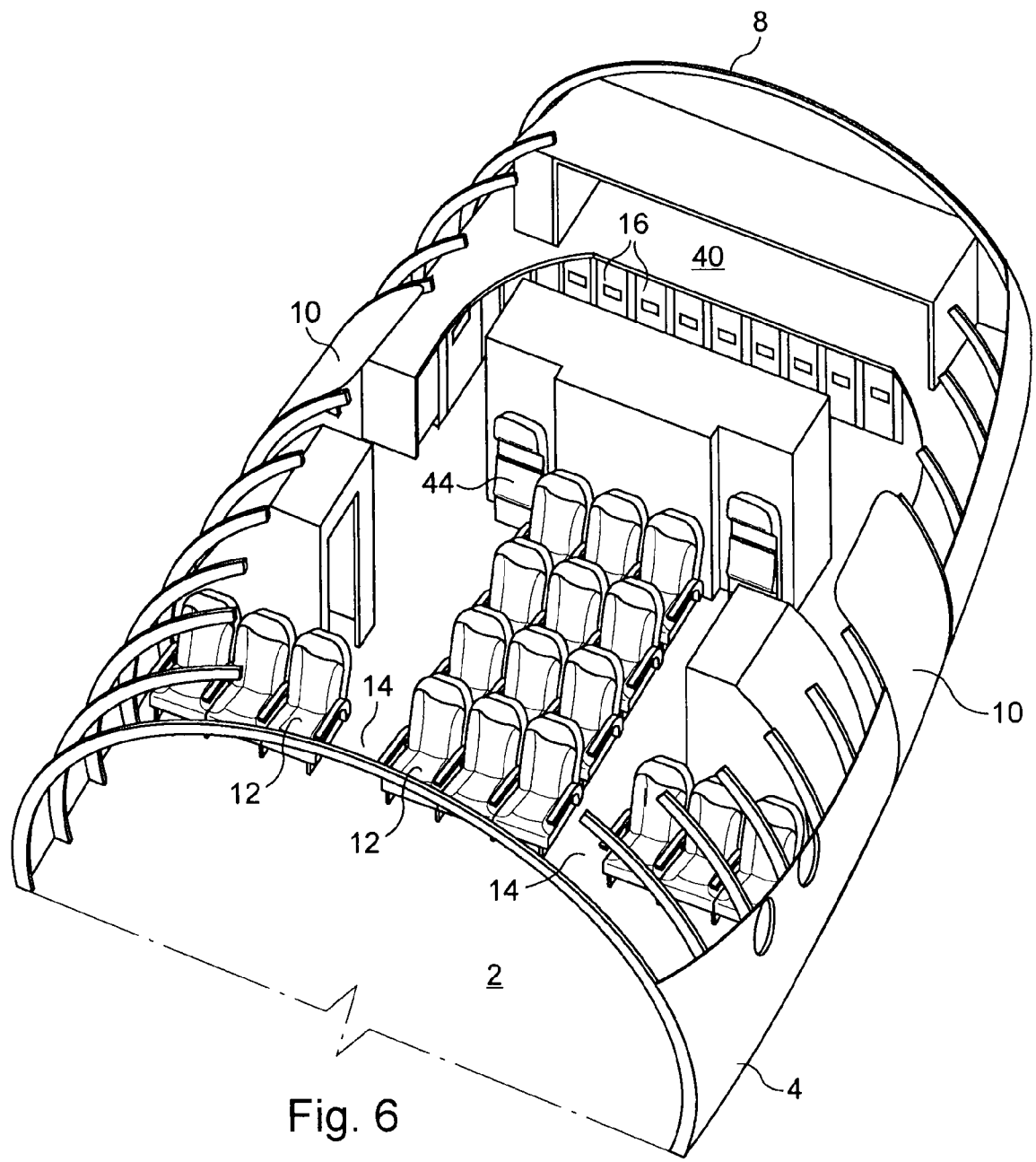
FIG. 6 is a perspective view of a fourth layout variant according to the invention.

FIGS. 5 and 6 show the variant embodiments in which there no longer is a transverse aisle at the last door of the aircraft. The space saved in this way then is turned to good account in order to increase the number of seats 12 in the aircraft cabin. The various components behind the last door of the aircraft shown on these Figures are, except for a few details, similar to those of FIGS. 1 to 3. For these two variant embodiments, the same references as those used previously to designate similar components then will be retained.

According to the embodiment of FIG. 5, housings 50 are provided to occupy the center of the aisle 30 that may be seen on FIGS. 1 to 4. These housings 50 are placed next to the second row of housings 22 and make it possible to accommodate four carts 16 in all, in transverse position in relation to the orientation of the aircraft. The carts 16, in stored position in their housings 50, are arranged back to back. The housings 50 are oriented so that the carts 16 can come out by moving in the direction of the side wall of the aircraft cabin.

As seen on FIG. 5, the two aisles 14 extend as far as the housings 50. Sets of three seats 12 are arranged between these aisles 14 as far as the housings 50. There is no possibility of passage between the last seats 12 arranged between the aisles 14 and the housings 50. The space that may be seen between the seats 12 closest to the housings 50 and the said housings 50 only allows tilting the back of the corresponding seats 12 to enhance the comfort of the passengers.

In this embodiment, the aisle 24 that runs between the first row of housings 20 and the second row of housings 22 is used not only for preparing meals and loading and unloading the carts 16, but also is provided for serving as an evacuation aisle in case of emergency. As a matter of fact, this aisle makes it possible to cross from one side of the aircraft to the other at the last door 10 of the aircraft. The various spaces used for an evacuation are represented on FIG. 5: thus the aisles 14 that allow access to the seats 12 are identified first. In front of each door of the last door 10 is a passage space 52 that makes it possible to have free access to the door 10 from the aisles 14: according to the standards, no object is to be in this passage space, which is to remain clear in order to be able to be used as a passage at any moment during an evacuation of the aircraft. On either side of each passage space, at each of the doors of the last door 10, is an evacuation assistance space 54 which is provided in order that a member of the personnel may help the passengers to leave the aircraft during an evacuation. Finally, the two passage spaces 52 are connected by the aisle 24 that skirts the second row of housings 22. It was seen above that the transverse portion 26 of the aisle 24 had a width greater than 38'. It also is advisable to make sure that the longitudinal branches 28 of this aisle 24 are themselves sufficiently wide to allow an evacuation in complete safety (the standards here provide for a minimal width of 21.5', or 54.61 cm).

In the embodiment of FIG. 5 in comparison with the embodiment of FIG. 1, it is provided that all the housings 20, 22 and 50 intended to accommodate carts 16 are refrigerated. For this reason, there are changes (slight) introduced at the second row of housings 22 in comparison with the embodiment of FIGS. 1 to 3.

As for the embodiment of FIG. 6, it again is based on the embodiments of FIG. 1 to 3 and there again is seen a second row of housings 22 comprising refrigerated housings 22 at the center and non-refrigerated housings at the ends. Other variant embodiments may be considered, for example with housings that are either all refrigerated or all non-refrigerated. The latter variant makes it possible to save space which can be turned to good account for accommodating a greater number of carts or for implementing an additional facility such as a lavatory, for example.

In comparison with the embodiments of FIGS. 1 to 3, there no longer is any monument 32 on FIG. 6 and seats 12 are provided until they come up to, or more or less up to, the second row of housings 22. Just as for the embodiment of FIG. 5, even if the seats 12 do not come up to the second row of housings 22, the space remaining between the seats 12 and this second row of housings 22 is reduced. This space does not permit creating a passage between the seats 12 and the housings 22 but is, for example, sufficient to allow a tilting of the backs of the seats 12.

In this embodiment of FIG. 6, an evacuation is conducted in the same manner as in the embodiment shown on FIG. 5. In a view from above, the embodiment of FIG. 6 would be very close to FIG. 5 and would make it possible to see again the same spaces used during an emergency evacuation (aisles 14 and 24, passage spaces 52 and evacuation assistance spaces 54).

The embodiment of FIG. 6 presents the feature of providing seats 12 at the door 10. The known aircraft cabin layouts of the prior art do not make it possible to have this feature.

In the various embodiments represented, the carts that are stored in the rear part of the cabin, behind the last door 10, are for the most part stored longitudinally. Only the demi-carts are stored crosswise. The proposed layout makes it possible to optimize the space in the zone located behind the last door.

Carts are stored (longitudinally) all along the watertight bulkhead forming the far end of the aircraft cabin. Likewise, the carts that face the carts stored longitudinally at the far end of the cabin of the aircraft also are stored longitudinally.

By virtue of this arrangement of the carts, the floor space may be optimized, thus making it possible to have more carts (stored) in a given and limited space (the rear of the passenger cabin, behind the last door). This arrangement also is favorable for on-board service. It makes it possible, at the aisle located between the two rows of housings for the carts, to have a wide work space in which several individuals can move about and work without hampering each other. The configurations described also allow a direct access to each of the main aisles (those serving the seats) from the work space, which permits a better flow of service to the passengers.

The layouts proposed on FIGS. 1 to 4 also allow an efficient management of the carts during stopovers. It may be provided to remove carts on one side of the aircraft via the last door and to bring in other carts on the other side. This operation may be performed without the removed carts passing the carts that are entering the aircraft. Appreciable time may be saved here in the time needed for unloading and loading of the carts in the aircraft. The configurations represented on FIGS. 1 to 4 also offer these advantages when the loading and removal of the carts is performed via only one side.

The fact of optimizing the number of carts stored to the rear of the last door of the aircraft makes it possible to reduce the number of carts to be accommodated in the cabin, ahead of this last door.

This invention is not limited to the embodiments described above by way of non-limitative examples and to the variants indicated. It also concerns the variant embodiments within the capacity of the individual skilled in the art in the context of the claims below.

The invention claimed is:
1. A fuselage comprising:
two side walls that oppose each other;
a plurality of side doors disposed along the two side walls, the plurality of side doors including a last side door, which is disposed closest to a rear of the fuselage;
a space for work and storage, the space being disposed, with respect to a longitudinal axis of the fuselage, between the last side door and a bulkhead that is transverse to the longitudinal axis of the fuselage, the space being delimited by the two side walls and by the bulkhead, and the space including housings that accommodate carts therein;
a plurality of the housings arranged along the bulkhead between the side walls, such that the plurality of the housings is accessible via a first side of a transverse portion of a first aisle, the transverse portion being transverse relative to the longitudinal axis of the fuselage; and
a set including at least one housing for carts disposed facing the plurality of the housings arranged along the bulkhead on a second side of the transverse portion of the first aisle,
wherein the transverse portion extends in a widthwise direction between the plurality of the housings at the first side of the transverse portion of the first aisle and the set including at least one housing on the second side of the transverse portion of the first aisle, such that a width of the transverse portion is arranged entirely between the last side door and the bulkhead,
wherein each of the housings of the space extends longitudinally parallel with respect to the longitudinal axis of the fuselage, wherein a second aisle extends transverse to the longitudinal axis of the fuselage at the last side door, such that the set including at least one housing is between the second side of the transverse portion of the first aisle and a first side of the second aisle, and wherein a monument including monument housings is disposed facing the set including at least one housing and bordering a second side of the second aisle, a lengthwise direction of the monument housings extending transverse to the longitudinal axis of the fuselage.

2. The fuselage according to claim 1, wherein the set including at least one housing further includes at least one lavatory, and wherein an access door for the at least one lavatory is arranged such that the at least one lavatory is accessible from the second aisle.

3. The fuselage according to claim 1, wherein seats are arranged along a back side of the set including at least one housing, the back side of the set including at least one housing being opposite the second side of the transverse portion of the first aisle and facing the monument.

4. The fuselage according to claim 1, wherein a work surface is disposed above the plurality of the housings arranged along the bulkhead.

5. An aircraft that transports passengers, comprising a fuselage according to claim 1.

6. The fuselage according to claim 1, wherein the plurality of the housings arranged along the bulkhead includes a row of housings side by side, spanning an entirety of a width between the two side walls, such that a first housing on a first end of the row of housings contacts a first side wall of the two side walls and a second housing on a second end of the row of housings contacts a second side wall of the two side walls.

7. The fuselage according to claim 6, wherein the first housing and the second housing are disposed further toward a front of the fuselage than a rest of the row of housings.

* * * * *